United States Patent

[11] 3,625,354

[72] Inventor Gunter Heitmann
 Frankfurt am Main, Germany
[21] Appl. No. 792,831
[22] Filed Jan. 21, 1969
[45] Patented Dec. 7, 1971
[73] Assignees Metallgesellschaft Aktiengesellschaft
 Frankfurt am Main, Germany;
 The Steel Company of Canada Limited
 Ontario, Canada
[32] Priority Jan. 23, 1968
[33] Germany
[31] P 15 83 774.8

[54] PROCESS FOR MAGNETICALLY SEPARATING REDUCED IRON-CONTAINING MATERIALS DISCHARGED FROM A ROTARY KILN
4 Claims, No Drawings

[52] U.S. Cl. .................................................. 209/3,
 209/38, 209/214
[51] Int. Cl. .................................................. B03b 1/00,
 B03c 1/30

[50] Field of Search .................................. 209/212–214,
 8, 38–40, 11, 3; 241/20, 24

[56] References Cited
UNITED STATES PATENTS

| | | | |
|---|---|---|---|
| 1,512,870 | 10/1924 | Ullrich | 209/214 |
| 2,990,124 | 6/1961 | Cavanagh | 209/214 X |

FOREIGN PATENTS

| | | | |
|---|---|---|---|
| 67,456 | 5/1927 | Sweden | 209/214 |
| 227,019 | 1/1925 | Great Britain | 209/214 |
| 1,160,099 | 2/1958 | France | 209/213 |

Primary Examiner—Tim R. Miles
Assistant Examiner—Robert Halper
Attorneys—Francis D. Stephens and Hugo Huettig, Jr.

ABSTRACT: Iron-containing materials reduced in a rotary kiln are separated magnetically into a high iron-containing fraction and a low-ash reducing agent fraction in two stages, one above and one below 1,000 oersteds. The reducing agent fraction which is recycled to the kiln, keeps the ash content of the recycled reducing agent substantially constant.

PROCESS FOR MAGNETICALLY SEPARATING REDUCED IRON-CONTAINING MATERIALS DISCHARGED FROM A ROTARY KILN

This invention relates to a process of separating originally oxidic, iron-containing materials which have been reduced in a rotary kiln, in which process the solids mixture which is discharged from the rotary kiln is cooled and by screening and magnetic separation is separated into its individual solids components.

For economic reasons, the solids mixture, which is discharged from a rotary kiln for a direct reduction of iron-containing oxidic materials, must be treated to separate the surplus reducing agent before the mixture is processed further, preferably in a rotary kiln.

German Pat. No. 366,352 discloses a process in which fuel residues, such as ashes and slags, are treated by highly concentrated magnetic fields in which the fuel contained in the residue is separated from the incombustible, iron-containing slags.

In a process of producing sponge iron, as disclosed in Technische Mittilungen Krupp, Vol. 19, 1961, pages 189 et seq., the solids mixture which is discharged from the rotary kiln is cooled and is subsequently subjected to screening and magnetic separation. In the succeeding screening stage, the surplus reducing agent is separated from the sponge iron. An improvement in this process has been described in "Stahl und Eisen," 85, 1965, No. 22, pages 1371 et seq. When the mixture of coal, lime and ashes has been subjected to screening and magnetic separation, the surplus reducing agent contained in the mixture is separated in an electrostatic process.

An electrostatic separation of the matter discharged from a rotary kiln is also disclosed in British Pat. No. 930,029.

The mixture of coal, lime and ash may be subjected to a gravity separation process rather than to electrostatic separation as disclosed in "Stahl und Eisen," 1967, No. 9, pages 534 et seq.

In another process, the matter discharged from the rotary kiln is separated into three screen-sized fractions and each fraction is subsequently separated magnetically. The surplus reducing agent from all three fractions is recycled into the rotary kiln as described in "Stahl und Eisen," 87, 1967, pages 534 et seq.

All these known processes have the disadvantage that the carbon content in the circulating reducing agent decreases constantly and the ash content increases to the same extent. In conjunction therewith, the iron content of the ash increases due to an enrichment of the iron in the ash itself and to a deposition of iron-containing fine particles on the ash particles which come from the kiln charge. This tendency to deposit increases with the ash content of the raw coal and is inverse to the softening and melting point of the coal ash.

The deposition of iron-containing fine particles as well as of lime and dolomite from the kiln charge results in a further lowering of the melting point of the coal ash so that those particles of the reducing agent which have the highest content of ash or iron are softened and sinter together at temperatures near the reducing temperature. As a result, the carbon content of these particles is blocked and there is an undesired formation of crusts on the wall of the rotary kiln.

The object of this invention is to produce a more effective way to separate the reduced iron from the reducing agent so that the reducing agent recycled to the kiln has a very low iron content.

In general, this object is obtained by the surprising finding that the ash content of the circulating reducing agent can be kept constant if those particles which have the highest ash content are removed or if the screen-sized particle size fraction of 1–10 millimeters, preferably 1–8 millimeters, which contains by far the largest portion of the surplus reducing agent, is subjected to a two-stage magnetic separation to remove those ash particles which have become magnetic by the deposition of iron-containing fine particles, one of said stages being operated at a low field strength below 1,000 oersteds to remove by attraction the sponge iron, whereas the other stage is operated at a higher field strength above 1,000 oersteds to remove by attraction the coke fraction having a higher ash content, and the coke fraction having a lower ash content is recycled into the rotary kiln.

If the reducing agent has a low sulfur content or the coal ash has a basic composition so that no sulfur-combining additives or only small amounts thereof are required in the rotary kiln charge, it will be desirable to subject also the sieve-sized fraction having a particle size below 1 millimeter to a two-stage magnetic separation before it is processed further, preferably by being recycled to the rotary kiln.

To improve the separating action of the magnetic separation it will be desirable in some cases to precrush the sieve-sized fractions by means of a disc mill or impact mill or the like unit before they are subjected to magnetic separation. In other cases, processing in an air separator is recommended.

The two-stage magnetic separation may be performed in such a manner that a field strength above 1,000 oersteds is used in the first stage and a field strength below 1,000 oersteds in the second stage, or a field strength below 1,000 oersteds is used in the first stage and a field strength above 1,000 oersteds in the second stage.

In the first embodiment of the magnetic separation, the first stage, above 1,000 oersteds, results in a removal by attraction of a contaminated sponge iron product, that is a sponge iron and high-ash coke fraction, whereas the low-ash coke fraction is left. The contaminated sponge iron product is fed to the second stage, below 1,000 oersteds, where the sponge iron is removed by attraction and the high-ash coke fraction is left. The low-ash coke fraction from the first stage is recycled to the rotary kiln and the high-ash coke fraction from the second stage is discarded.

In the second embodiment of the magnetic separation, the first stage below 1,000 oersteds results in a removal of the sponge iron by attraction whereas a low-ash coke fraction is left and is fed into the second stage above 1,000 oersteds, where the high-ash coke fraction is removed by attraction and the low-ash coke fraction is left.

One embodiment of this invention involving sieve-sized fractions having particle sizes of 1–8 millimeters and above 1 millimeter, respectively, is now explained more in detail and by way of example with reference to the table indicating the carbon and iron contents.

| Particle size fraction 1–8 mm. | | Particle size fraction below 1 mm. | |
|---|---|---|---|
| (All % by weight) | | | |
| C | Fe | C | Fe |
| 81.9 | 1.01 | 65.3 | 2.34 |
| 82.2 | 1.49 | 66.9 | 3.10 |
| 88.1 | 0.78 | 58.6 | 1.50 |
| 80.0 | 1.40 | 66.4 | 2.60 |
| 76.3 | 1.17 | 55.0 | 2.60 |
| 79.3 | 1.72 | 60.0 | 1.90 |
| 79.2 | 2.30 | 58.4 | 3.60 |
| 77.8 | 1.70 | 57.8 | 1.94 |
| 74.1 | 0.80 | 58.3 | 1.80 |
| 71.1 | 0.70 | 56.8 | 1.70 |
| 79.2 | 0.80 | 70.9 | 1.50 |
| 73.9 | 1.20 | 64.9 | 1.90 |
| 79.0 | 1.80 | 60.1 | 1.30 |
| 74.7 | 1.40 | 63.4 | 2.20 |
| 78.6 | 1.00 | 61.0 | 2.10 |
| 78.5 | 1.80 | 65.5 | 2.60 |
| 81.0 | 3.00 | 67.1 | 1.40 |

As is apparent from the above table, which shows the results obtained during prolonged tests, the process according to this invention enables the maintenance of a constant carbon content, with a small variation, during a long period of operation, and an avoiding of any undesired enriching of ash and iron in the reducing agent which is recycled to the rotary kiln. The advantages afforded by this invention reside specifically in that it enables an economic use of high-ash coals as a reducing agent in the reduction of oxidic iron ore and is unique in enabling the use of coals having low softening or melting points as a reducing agent in the rotary kiln.

It will be understood that the process according to the invention can be used in continuous and batch operation, as may be required.

EXAMPLES

The discharge materials of a rotary kiln were cooled and separated in three fractions by screening. The fraction having a size above 8 mm. consisted of sponge iron pellets. The fractions having a size from 1 to 8 mm. and below 1 mm. were magnetically separated

EXAMPLE 1

The fraction having a size from 1 to 8 mm. consisted of 4.3% Fe, 74.3% C, 16% $SiO_2$, 3.5% CaO, 1.1% $Al_2O_3$. It was fed to a first stage of the magnetic separation with 650 oersteds. A sponge iron fraction consisting of 95% Fe, 0.3% C, 2.5% $SiO_2$, 1% CaO, 0.5% $Al_2O_3$ was attracted and removed. The remaining material was fed to the second magnetic separation with 12,000 oersteds. A low-ash coke fraction consisting of 1.43% Fe, 79.1% C, 14.1% $SiO_2$, 3.2% CaO, 1% $Al_2O_3$ was attracted and recycled to the rotary kiln. The high-ash coke fraction consisting of 15.2% Fe, 3.8% C, 59.5% $SiO_2$, 11.3% CaO, 4.1% $Al_2O_3$ was discarded.

The fraction having a size from below 1 mm. consisted of 3.53% Fe, 55.2% C, 31.4% $SiO_2$, 7.1% CaO, 2.4% $Al_2O_3$. It was fed to a first stage of the magnetic separation with 650 oersteds. A sponge iron fraction consisting of 88.5 Fe, 3.6 C, 5.4 $SiO_2$, 1.1% CaO, 0.5% $Al_2O_3$ was attracted and removed. The remaining material was fed to the second magnetic separation with 12,000 oersteds. A low-ash coke fraction consisting of 1.9% Fe, 60.2% C, 28.5% $SiO_2$, 6.4% CaO, 2.3% $Al_2O_3$ was attracted and recycled to the rotary kiln. The high-ash coke fraction consisting of 7.5% Fe, 5.1% C, 65.2% $SiO_2$, 14.1% CaO, 4.9% $Al_2O_3$ was discarded.

EXAMPLE 2

The fraction having a size from 1 to 8 mm. consisted of 4.4% Fe, 7.41% C, 16.1% $SiO_2$, 3.5% CaO, 1.2% $Al_2O_3$. It was fed to a first stage of the magnetic separation with 12,000 oersteds. A low-ash coke fraction consisting of 1.38% Fe, 79.8% C, 13.9% $SiO_2$, 3.1% CaO, 1.7% $Al_2O_3$ was removed and recycled to the rotary kiln. The attracted remaining material was fed to the second stage of the magnetic separation with 650 oersteds. A sponge iron fraction consisting of 94.8 Fe, 0.68% C, 3.2% $SiO_2$, 0.7% CaO, 0.2% $Al_2O_3$ was attracted and removed. The high-ash coke fraction consisting of 14.1% Fe, 4% C, 58.5% $SiO_2$, 12.5% CaO, 4.5% $Al_2O_3$ was discarded.

The fraction having a size below 1 mm. consisted of 3.27% Fe, 56.1% C, 30.5% $SiO_2$, 6.8% CaO, 2.4% $Al_2O_3$. It was fed to SiO first stage of the magnetic separation CaO, 12,000 oersteds. A low-ash O fraction consisting of 2.05% Fe, 59.4% C, 29.7% $SiO_2$, 6.4% CaO, SiO% $Al_2O_3O$ was removed and recycled to the rotary kiln. The attracted remaining material was fed to the second stage of the magnetic separation with 650 oersteds. A sponge iron fraction consisting of 85.5% Fe, 3.8% C, 7.8% $SiO_2$, 1.7% CaO, 0.6% $Al_2O_3$ was attracted and removed. The high-ash coke fraction consisting of 8.1% Fe, 4.8% C, 64.1% $SiO_2$, 14.1% CaO, 4.9% $Al_2O_3$ was discarded.

Having now described the means by which the object of this invention is obtained,

I claim:

1. A process for separating originally oxidic iron-containing materials which, by means of a carbonaceous reducing agent, having been reduced to sponge iron in and discharged from a rotary kiln as high- and low-ash content particles composed of sponge iron, coke and ash, and then cooled and screened into a particle size fraction having a size of from 1 to 10 mm., preferably from 1 to 8 mm., and a fraction below 1 mm., comprising magnetically separating the fractions in two successive stages, in which the 1 to 10 mm. fraction is separated in a stage operated in a low field strength below 1,000 oersteds to remove the sponge iron by attraction, and in the other of which the remainder of said 1 to 10 mm. is separated in a stage operated at a higher field strength above 1,000 oersteds to remove a high-ash content coke fraction and leaving a low-ash coke fraction for recycling to the rotary kiln.

2. A process as in claim 1, further comprising separating the below 1-mm. fraction in a similar two-stage process.

3. A process as in claim 1 in which a first stage separation is operated at a high field strength above 1,000 oersteds, and a second stage separation is operated below 1,000 oersteds.

4. A process as in claim 1, in which a first stage separation is operated at a low field strength below 1,000 oersteds, and a second stage separation is operated above 1,000 oersteds.

* * * * *